US011263226B2

(12) United States Patent
Chitty et al.

(10) Patent No.: US 11,263,226 B2
(45) Date of Patent: Mar. 1, 2022

(54) REAL-TIME INTELLIGENCE ENGINE FOR DATA ASSET DISCOVERY

(71) Applicant: Bank of America Corporation, Charlotte, NC (US)

(72) Inventors: Saisrikanth Chitty, Hyderabad (IN); Gaurav Bansal, Hyderabad (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 331 days.

(21) Appl. No.: 16/700,496

(22) Filed: Dec. 2, 2019

(65) Prior Publication Data

US 2021/0165790 A1 Jun. 3, 2021

(51) Int. Cl.
*G06F 16/2458* (2019.01)
*G06F 16/28* (2019.01)

(52) U.S. Cl.
CPC ........ *G06F 16/2465* (2019.01); *G06F 16/283* (2019.01)

(58) Field of Classification Search
CPC ............................ G06F 16/2465; G06F 16/283
See application file for complete search history.

(56) References Cited

U.S. PATENT DOCUMENTS

| | | |
|---|---|---|
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |

(Continued)

*Primary Examiner* — Etienne P Leroux
*Assistant Examiner* — Husam Turki Samara
(74) *Attorney, Agent, or Firm* — Moore & Van Allen PLLC; Anup Shrinivasan Iyer

(57) ABSTRACT

Systems, computer program products, and methods are described herein for providing real-time intelligence engine for data asset discovery. The present invention is configured to receive an indication that a first user has initiated a creation of a first multi-dimensional cube using a first computing node; initiate an asset recovery engine on the first computing device to: compare attributes associated with the first multi-dimensional cube with attributes associated with the multi-dimensional cubes stored on the first edge computing unit of the first computing node to determine a match; retrieve a first configuration file associated with the subset of the one or more multi-dimensional cubes stored on the first edge computing unit of the first computing node; and execute the creation of the first multi-dimensional cube based on the first configuration file using the first computing node.

20 Claims, 5 Drawing Sheets

(56) References Cited

U.S. PATENT DOCUMENTS

| | | | |
|---|---|---|---|
| 6,515,681 B1 | 2/2003 | Knight | |
| 6,516,320 B1 | 2/2003 | Odom et al. | |
| 9,081,830 B1 * | 7/2015 | Stolte ................... | G06F 16/283 |
| 9,960,975 B1 * | 5/2018 | Van Horenbeeck ........................ | |
| | | | H04L 63/1416 |
| 2011/0055146 A1 * | 3/2011 | Mahajan ............... | G06F 16/283 |
| | | | 707/600 |
| 2014/0181002 A1 * | 6/2014 | Christian .............. | G06F 16/283 |
| | | | 707/600 |
| 2015/0370881 A1 * | 12/2015 | Kalki ................... | G06F 16/283 |
| | | | 707/600 |

* cited by examiner

REAL-TIME INTELLIGENCE ENGINE FOR DATA ASSET DISCOVERY

FIELD OF THE INVENTION

The present invention embraces a system for providing a real-time intelligence engine for data asset discovery.

BACKGROUND

Analytics servers facilitate the work of building and populating analytics indexes such as cubes, which define spatial relationships between documents and concepts measured by their distance in a multi-dimensional space. These servers process data on various subject matters across various technologies. Widespread use of data across the technology platform has resulted in increased processing times for each cube causing performance issues and network and latency issues. As long as data grows, these issues will play a key role in data analysis and performance.

Therefore, there is a need for a real-time intelligence engine for data asset discovery.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for providing real-time intelligence engine for data asset discovery is presented. The system comprising: at least one non-transitory storage device; and at least one processing device coupled to the at least one non-transitory storage device, wherein the at least one processing device is configured to: electronically receive an indication that a first user has initiated a creation of a first multi-dimensional cube using a first computing node, wherein the first computing node is associated with a first computing cluster; initiate an asset recovery engine on the first computing node, wherein the first computing node is configured to store one or more configuration files associated with one or more multi-dimensional cubes that have been previously created by one or more computing nodes within the first computing cluster on a first edge computing unit of the first computing node, wherein initiating further comprises: comparing one or more attributes associated with the first multi-dimensional cube with one or more attributes associated with the one or more multi-dimensional cubes stored on the first edge computing unit of the first computing node to determine a match; determining a subset of the one or more multi-dimensional cubes stored on the first edge computing unit of the first computing node based on at least the match; and retrieving a first configuration file associated with the subset of the one or more multi-dimensional cubes stored on the first edge computing unit of the first computing node; and execute the creation of the first multi-dimensional cube based on the first configuration file using the first computing node.

In some embodiments, the at least one processing device is further configured to: determine that the one or more attributes associated with the first multi-dimensional cube does not match the one or more attributes associated with the one or more multi-dimensional cubes stored on the first edge computing unit of the first computing node; and retrieve one or more attributes associated with one or more multi-dimensional cubes stored on a second edge computing unit of a second computing node, wherein the second computing node is associated with a second computing cluster.

In some embodiments, the at least one processing device is further configured to: compare the one or more attributes associated with the first multi-dimensional cube with the one or more attributes associated with the one or more multi-dimensional cubes stored on the second edge computing unit of a second computing node to determine a match; and determine a subset of the one or more multi-dimensional cubes stored on the second edge computing unit of the second computing node based on at least the match.

In some embodiments, the at least one processing device is further configured to: retrieve metadata from a second configuration file associated with the subset of the one or more multi-dimensional cubes stored on the second edge computing unit of the second computing node; transmit the metadata retrieved from the second configuration file to the first edge computing unit of the first computing node; and execute the creation of the first multi-dimensional cube based on the metadata retrieved from the second configuration file.

In some embodiments, the at least one processing device is further configured to: update the first configuration file with the metadata retrieved from the second configuration file.

In some embodiments, the at least one processing device is further configured to: determine a partial match between the one or more attributes associated with the first multi-dimensional cube with the one or more attributes associated with the one or more multi-dimensional cubes stored on the second edge computing unit of the second computing node; and determine the subset of the one or more multi-dimensional cubes stored on the second edge computing unit of the second computing node based on at least the partial match.

In some embodiments, the at least one processing device is further configured to: determine that the one or more attributes associated with the first multi-dimensional cube does not match the one or more attributes associated with the one or more multi-dimensional cubes stored on the second edge computing unit of the second computing node; and retrieve one or more attributes associated with one or more multi-dimensional cubes stored on a centralized enterprise database server.

In some embodiments, the at least one processing device is further configured to: compare the one or more attributes associated with the first multi-dimensional cube with the one or more attributes associated with the one or more multi-dimensional cubes stored on the centralized enterprise database server to determine a match; and determine a subset of the one or more multi-dimensional cubes stored on the centralized enterprise database server based on at least the match.

In some embodiments, the at least one processing device is further configured to: retrieve a metadata from a third configuration file associated with the subset of the one or more multi-dimensional cubes stored on the centralized enterprise database server; and transmit the metadata retrieved from the third configuration file to the first edge computing unit of the first computing node; execute the creation of the first multi-dimensional cube based on the metadata retrieved from the third configuration file; and update the first configuration file with the metadata retrieved from the third configuration file.

In another aspect, a computer implemented method for providing real-time intelligence engine for data asset discovery is presented. The method comprising: electronically receiving an indication that a first user has initiated a creation of a first multi-dimensional cube using a first computing node, wherein the first computing node is associated with a first computing cluster; initiating an asset recovery engine on the first computing node, wherein the first computing node is configured to store one or more configuration files associated with one or more multi-dimensional cubes that have been previously created by one or more computing nodes within the first computing cluster on a first edge computing unit of the first computing node, wherein initiating further comprises: comparing one or more attributes associated with the first multi-dimensional cube with one or more attributes associated with the one or more multi-dimensional cubes stored on the first edge computing unit of the first computing node to determine a match; determining a subset of the one or more multi-dimensional cubes stored on the first edge computing unit of the first computing node based on at least the match; and retrieving a first configuration file associated with the subset of the one or more multi-dimensional cubes stored on the first edge computing unit of the first computing node; and executing the creation of the first multi-dimensional cube based on the first configuration file using the first computing node.

In yet another aspect, a computer program product for providing real-time intelligence engine for data asset discovery is presented. The computer program product comprising a non-transitory computer-readable medium comprising code causing a apparatus to: electronically receive an indication that a first user has initiated a creation of a first multi-dimensional cube using a first computing node, wherein the first computing node is associated with a first computing cluster; initiate an asset recovery engine on the first computing node, wherein the first computing node is configured to store one or more configuration files associated with one or more multi-dimensional cubes that have been previously created by one or more computing nodes within the first computing cluster on a first edge computing unit of the first computing node, wherein initiating further comprises: comparing one or more attributes associated with the first multi-dimensional cube with one or more attributes associated with the one or more multi-dimensional cubes stored on the first edge computing unit of the first computing node to determine a match; determining a subset of the one or more multi-dimensional cubes stored on the first edge computing unit of the first computing node based on at least the match; and retrieving a first configuration file associated with the subset of the one or more multi-dimensional cubes stored on the first edge computing unit of the first computing node; and execute the creation of the first multi-dimensional cube based on the first configuration file using the first computing node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
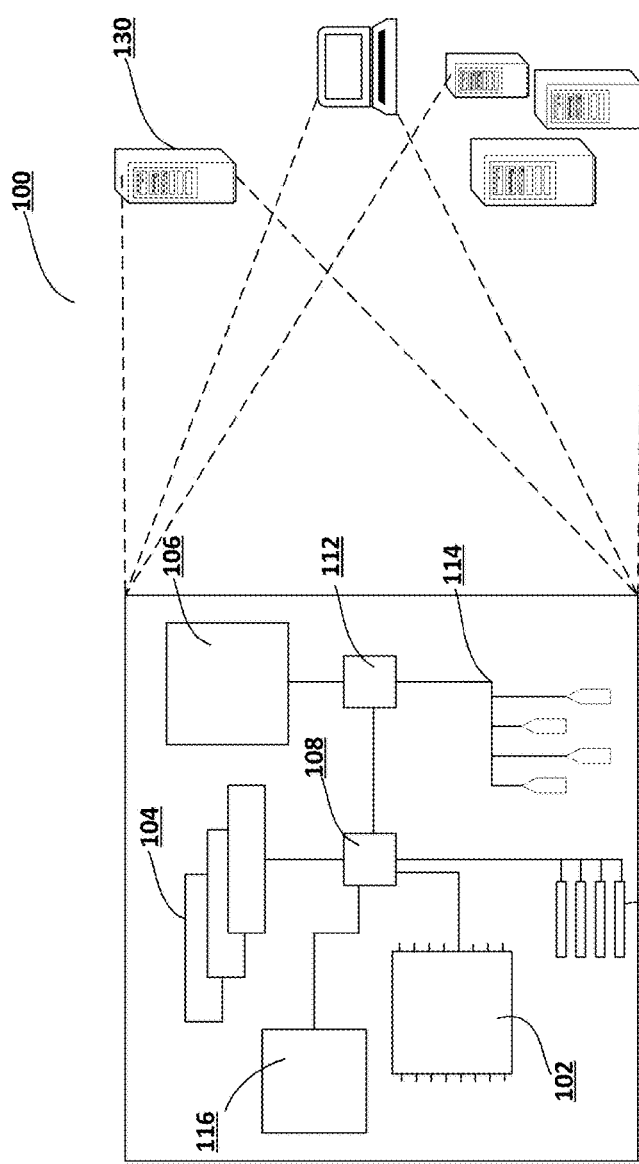
Figure 1:
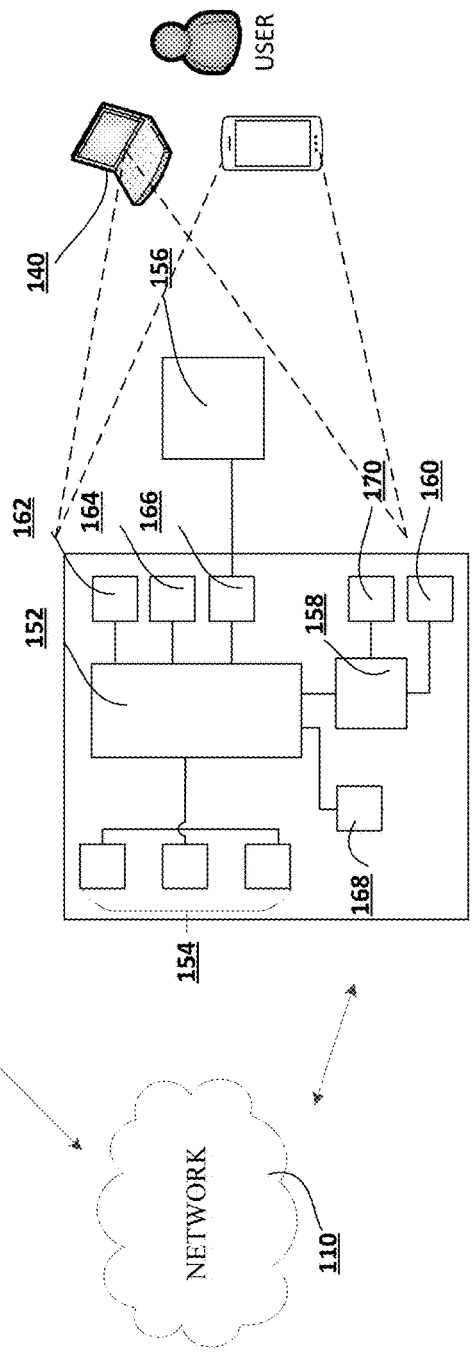
Figure 2:
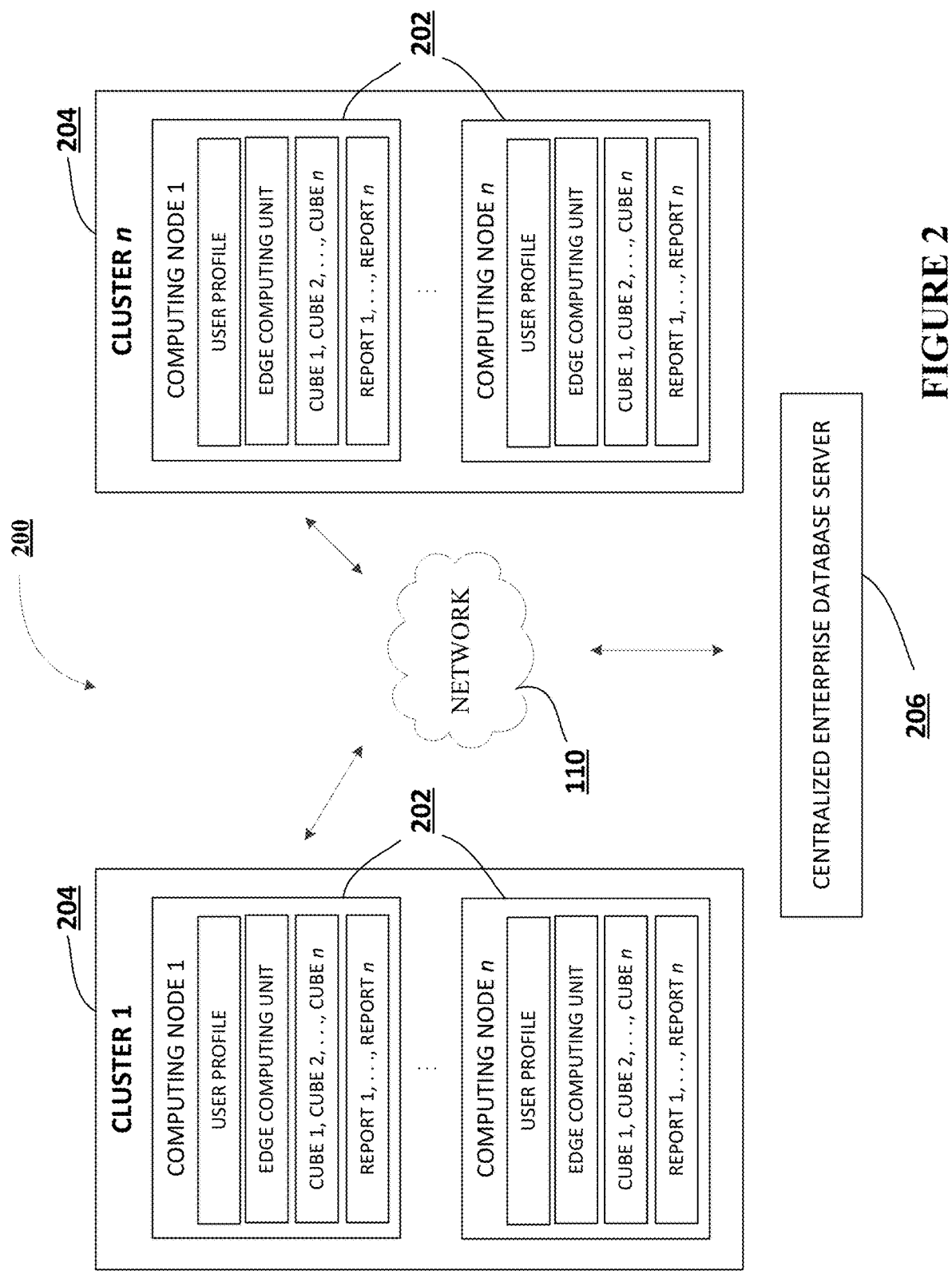
Figure 3:
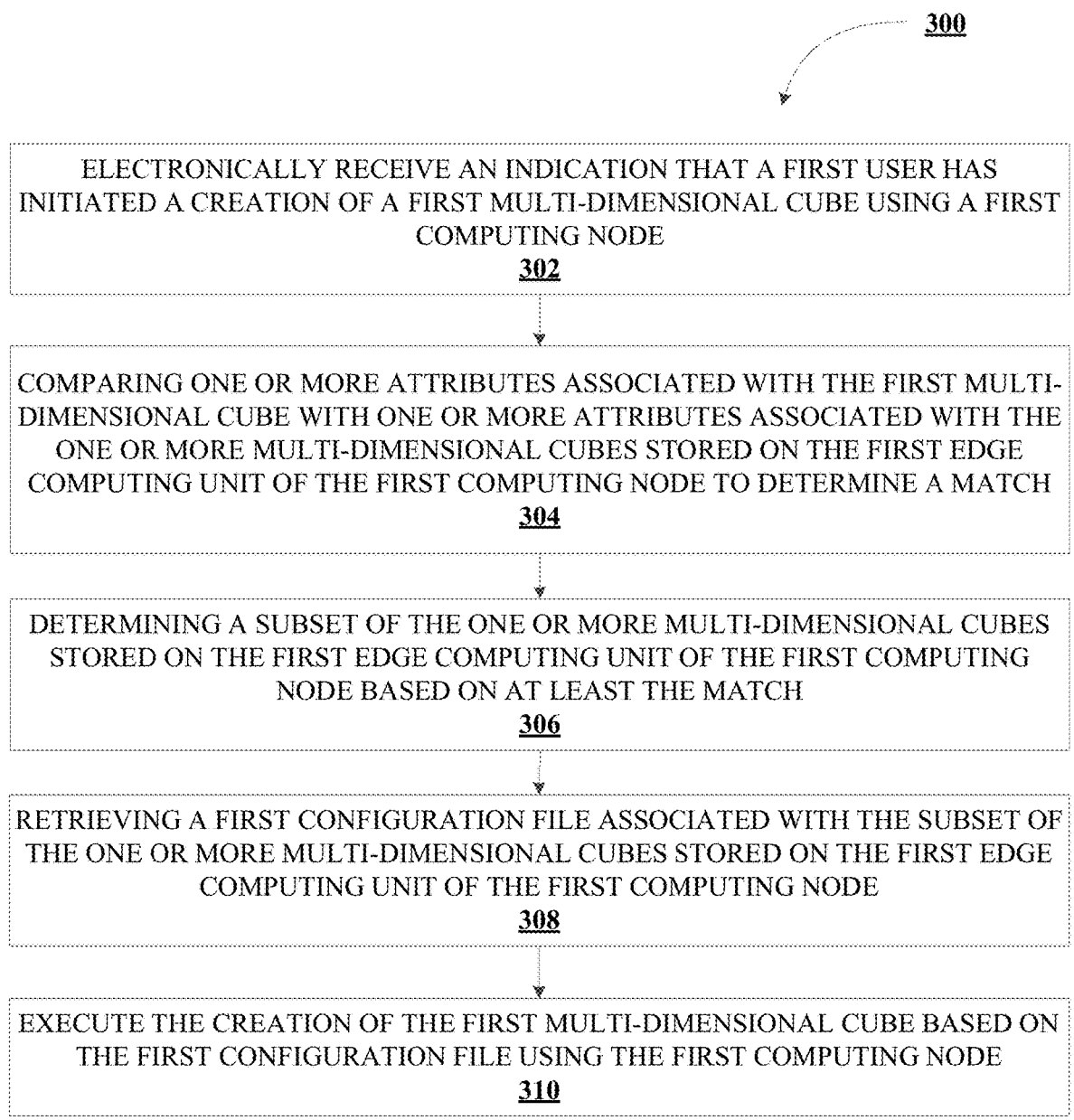
Figure 4:
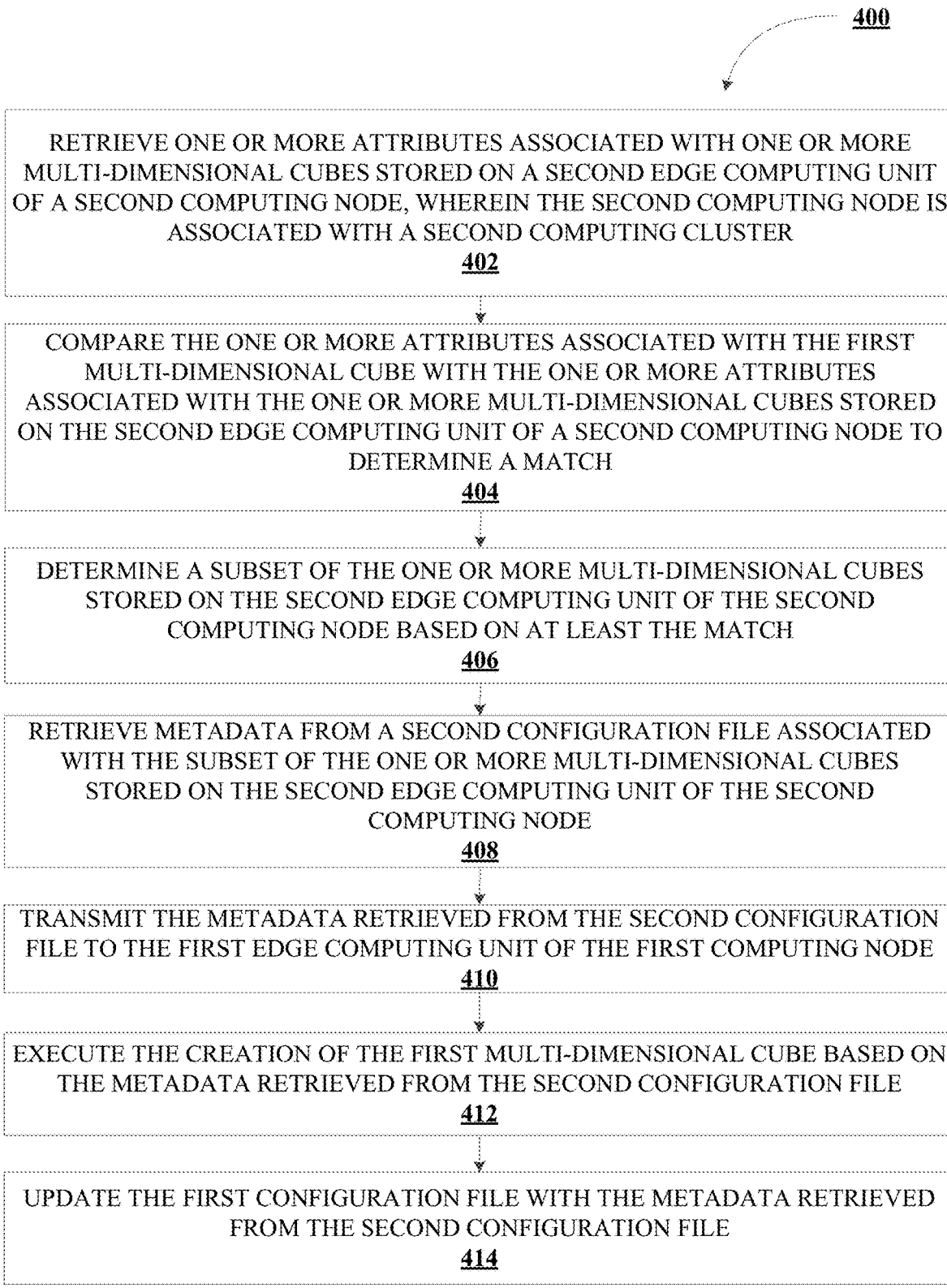
Figure 5:

Having thus described embodiments of the invention in general terms, reference will now be made the accompanying drawings, wherein:

FIG. 1 illustrates technical components of a system for providing real-time intelligence engine for data asset discovery, in accordance with an embodiment of the invention;

FIG. 2 illustrates a device architecture for a system for providing real-time intelligence engine for data asset discovery, in accordance with an embodiment of the invention;

FIG. 3 illustrates a process flow for providing real-time intelligence engine for intra-cluster data asset discovery, in accordance with an embodiment of the invention;

FIG. 4 illustrates a process flow for providing real-time intelligence engine for inter-cluster data asset discovery, in accordance with an embodiment of the invention; and FIG. 5 illustrates an exemplary metadata structure for a multi-dimensional cube and/or report, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

FIG. 1 presents an exemplary block diagram of the system environment for providing a real-time intelligence engine for data asset discovery 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a device architecture for a system for providing real-time intelligence engine for data asset discovery 200, in accordance with an embodiment of the invention. As shown in FIG. 2, the device architecture includes a plurality of computing clusters, as indicated by cluster 1 . . . cluster n 204. Each computing cluster 204 includes a plurality of computing nodes, as indicated by computing node 1, computing node 2, . . . , computing node n 202. For purposes of the invention, a computing node 202 may be any computing device attached to a network with a unique network address. In some embodiments, a computing node 202 may be a user device similar to the user input system 140 described herein. In some other embodiments, a computing node 202 may be a communication element such as bridges, switches, hubs, and modems to other computers, printers, and servers. In yet other embodiments, a computing node 202 may be a combination of the above.

In one aspect, each computing cluster is comprised of multiple computing nodes with multiple cluster disk arrays that utilize a single connection device (bus). In such configurations, one server manages and owns each of the individual computing cluster disk arrays within the computing cluster. In another aspect, each of the computing nodes 202 owns its own copy of the computing cluster's configuration data, and this data is consistent across all nodes. This configuration is typically applicable for clusters with individual servers that are located in different geographic locations. In yet another aspect, a computing cluster may include a single computing node 202. Such a configuration is typically used for testing purposes. The cluster-node configuration contemplated herein may include any one of the configurations described herein, any combination of configurations thereof, or any other configurations (not described here) that may be applicable to same or similar device architecture. The plurality of computing nodes 202 within each computing cluster may be operatively connected to one another using various communication and network technologies described herein. In one aspect, the overall workload for each computing cluster is distributed among the multiple computing node 202 within the computing cluster to reduce downtime and outages. In some embodiments, in the event of an outage for one user device, the rest of the computing nodes 202 automatically redistribute the workload among the rest of the computing node 202.

In some embodiments, each computing node 202 may be configured to include an edge computing unit providing the computing node 202 with edge computing capabilities. Having edge computing capability brings computation and data storage closer to the location where it is needed, to improve response times and save bandwidth, instead of having to communicate with a centralized data processing warehouse, such as the centralized enterprise database server 206 show in FIG. 2. By having local processing capabilities, the present invention realizes data-stream acceleration, including real-time data processing without latency. This allows the applications stored on the computing nodes 202 to respond to data almost instantaneously. For purposes of the invention, any computing device being referred to as a "computing node" or "edge computing node" is to be construed as a computing node with edge computing capabilities.

In some embodiments, each computing node 202 may be configured to maintain at least a user preference. A user preference may be a collection of settings and information associated with a user. It can be defined as the explicit digital representation of the identity of the user with respect to the operating environment, which may include operating systems, software applications, or websites. The user preference may help in associating characteristics with a user and in ascertaining the interactive behavior of the user along with preferences.

In some embodiments, each the computing node may be configured to transmit and/or receive information from other computing nodes within the same computing cluster, computing nodes from other computing clusters, and/or the centralized enterprise database server 206. In one aspect, each computing node may include a configuration file. Typically, a configuration file contains parameters that define settings and preferences as applied to the computing node. In some embodiments, each computing node is configured to be capable of verifying its configuration file and updating the configuration file when necessary using metadata received from other computing nodes either within the same computing cluster or from computing nodes within other computing clusters. In one aspect, the computing nodes may be configured to broadcast metadata indicating an update to a configuration file to other computing nodes either within the same computing cluster or to other computing nodes within other computing clusters. Similarly, each computing node may be configured to receive the metadata from other computing nodes from either within the same computing cluster or other computing nodes within other computing clusters and update the configuration files accordingly. By updating the configuration files at each instance of metadata, the system may be configured to facilitate the creation of a multi-dimensional cube using optimized parameters available across the platform.

In some embodiments, the configuration file may include a number of features such as at least context, data columns and corresponding calculations, last processed on, processing time, or the like. In one aspect, the metadata may include updated information for each of the various features. In some embodiments, in response to receiving the metadata with updated information, each computing node may be configured to update its own configuration file to accommodate the dynamic features such as network, memory and processor utilization, and static features such as processing time, context, domain, and/or the like.

In some embodiments, each computing node 202 includes data assets such as cubes, reports, and affinity columns. In one aspect, cubes are a multi-dimensional database optimized for data warehouse and analytical processing applications. Data stored in each cube is categorized by dimensions and are optimized for analytical purposes so that they can report on a large number of records at a time. In one aspect, a report may refer to the specification that defines the information to include in a report, or the results themselves. In some embodiments, the system may be configured to include affinity columns for each configuration file. In one aspect, an affinity column may be used to identify co-occurrence relationships among various cubes and/or reports executed by an individual user or a group of users.

FIG. 3 illustrates a process flow for providing real-time intelligence engine for intra-cluster data asset discovery 300, in accordance with an embodiment of the invention. As shown in block 302, the process flow includes electronically receiving an indication that a first user has initiated a creation of a first multi-dimensional cube using a first computing node. In some embodiments, the first computing node may be associated with a first computing cluster. As described herein, each cluster is made up of a number of computing nodes that effort together so that they can be worked as a single system by the end users.

Next, as shown in block 304, the process flow includes comparing one or more attributes associated with the first multi-dimensional cube with one or more attributes associated with the one or more multi-dimensional cubes stored on the first edge computing unit of the first computing node to determine a match. In some embodiments, the system may be configured to initiate an asset recovery engine on the first computing node. In one aspect, the first computing node may be configured to store configuration files associated with one or more multi-dimensional cubes that have been previously created by one or more computing nodes within the first computing cluster. In some embodiments, the configuration files may be stored on a first edge computing unit of the first computing node. As used herein, an attribute may be any specification that defines a property of an object, element, or file. In one aspect, the one or more attributes may include information associated with a multi-dimensional cube. In this regard, the one or more attributed may be dimensions of a cube, with each dimension representing a particular cube criteria, measure, or fact.

Next, as shown in block 306, the process flow includes determining a subset of the one or more multi-dimensional cubes stored on the first edge computing unit of the first computing node based on at least the match. In some embodiments, a match may indicate that a same or similar multi-dimensional cube has previously been generated by the first computing node.

Next, as shown in block 308, the process flow includes retrieving a first configuration file associated with the subset of the one or more multi-dimensional cubes stored on the first edge computing unit of the first computing node. In some embodiments, each time a multi-dimensional cube or report is generated, the configuration file associated with the multi-dimensional cube is updated on the edge computing unit of the computing node with the metadata required to execute the multi-dimensional cube or report. In response to identifying the subset of the one or more multi-dimensional cubes stored on the first edge computing unit of the first computing node, the system may be configured to identify corresponding configuration files of each of the multi-dimensional cubes in the subset of the one or more multi-dimensional cubes identified. In some embodiment, each type of multi-dimensional cube may be associated with a common configuration file. In some other embodiments, each multi-dimensional cube, regardless of the type of multi-dimensional cube may be associated with individual, independent configuration files.

Next, as shown in block 310, the process flow includes executing the creation of the first multi-dimensional cube based on the first configuration file using the first computing node. Once the configuration files have been received, the system may be configured to execute the creation of the first multi-dimensional cube. In some embodiments, in addition to receiving the configuration file, the system may be configured to determine one or more affinity columns. As described herein, affinity columns may be used to identify co-occurrence relationships among various cubes and/or reports executed by an individual user or a group of users.

FIG. 4 illustrates a process flow for providing real-time intelligence engine for inter-cluster data asset discovery 400, in accordance with an embodiment of the invention. As shown in block 402, the process flow includes retrieving one or more attributes associated with one or more multi-dimensional cubes stored on a second edge computing unit of a second computing node, wherein the second computing node is associated with a second computing cluster. In some embodiments, the system may be configured to determine that the one or more attributes associated with the first multi-dimensional cube does not match the one or more attributes associated with the one or more multi-dimensional cubes stored on the first edge computing unit of the first computing node. In such cases, the system may be configured to access computing nodes in one or more different computing clusters connected to the network 110 to determine whether the edge computing units of computing nodes in other computing clusters have the required configuration file.

Next, as shown in block 404, the process flow includes comparing the one or more attributes associated with the first multi-dimensional cube with the one or more attributes associated with the one or more multi-dimensional cubes stored on the second edge computing unit of a second computing node to determine a match. Next, as shown in block 406, the process flow includes determining a subset of the one or more multi-dimensional cubes stored on the second edge computing unit of the second computing node based on at least the match. In some embodiments, the system may be configured to determine a partial match between the one or more attributes associated with the first multi-dimensional cube with the one or more attributes associated with the one or more multi-dimensional cubes stored on the second edge computing unit of the second computing node. In response the system may be configured to determine the subset of the one or more multi-dimensional cubes stored on the second edge computing unit of the second computing node based on at least the partial match.

Next, as shown in block 408, the process flow includes retrieving metadata from a second configuration file associated with the subset of the one or more multi-dimensional cubes stored on the second edge computing unit of the second computing node. In some embodiments, the metadata retrieved from the second configuration file may be in an unstructured format or a structured format that is unreadable. If the data structure is in an unstructured format, the metadata may need to be transformed into a structured format. Transforming unstructured data into structured data may include grouping aspects of the unstructured data into relations or classes based upon shared characteristics. The unstructured data is generally allocated specific features (data descriptions) related to the classes within each group to help in ordering and logical grouping. In addition, the unstructured data can be described by predefined formats (strings or value) with predefined lengths of characters. Once transformed, the metadata, now in a structured data format, are then capable of being read. In one aspect, each computing node may be associated with a specific data structure format. In another aspect, each computing node within a specific computing cluster may be associated with a specific data structure format. In yet another aspect, each computing node across multiple clusters may be associated with a specific data structure format. If the data structure is in a structured format, but unreadable by the computing node, the system may be configured to implement one or more data translation tools to convert the metadata from its current format to a format that is readable by the specific computing node.

Next, as shown in block 410, the process flow includes transmitting the metadata retrieved from the second configuration file to the first edge computing unit of the first computing node. Next, as shown in block 412, the process flow includes executing the creation of the first multi-dimensional cube based on the metadata retrieved from the second configuration file. Next, as shown in block 414, the process flow includes updating the first configuration file with the metadata retrieved from the second configuration file. In some embodiments, each time metadata associated with a configuration file is identified by a computing node, the edge computing units associated with each cluster may configured to update itself to accommodate the latest changes.

In some embodiments, the system may be configured to determine that the one or more attributes associated with the first multi-dimensional cube does not match the one or more attributes associated with the one or more multi-dimensional cubes stored on the second edge computing unit of the second computing node. In response, the system may be configured to retrieve one or more attributes associated with one or more multi-dimensional cubes stored on a centralized enterprise database server. In this regard, the system may be configured to compare the one or more attributes associated with the first multi-dimensional cube with the one or more attributes associated with the one or more multi-dimensional cubes stored on the centralized enterprise database server to determine a match. In response, the system may be configured to determine a subset of the one or more multi-dimensional cubes stored on the centralized enterprise database server based on at least the match. Once the subset of the one or more multi-dimensional cubes stored on the centralized enterprise database server are determined, the system may be configured to retrieve a metadata from a third configuration file associated with the subset of the one or more multi-dimensional cubes stored on the centralized enterprise database server. In response, the system may be configured to transmit the metadata retrieved from the third configuration file to the first edge computing unit of the first computing node. In response, the system may be configured to execute the creation of the first multi-dimensional cube based on the metadata retrieved from the second configuration file. Having executed the creation of the multi-dimensional cube, the system may then be configured to update the first configuration file with the metadata retrieved from the third configuration file. In some embodiments, the system may be configured to update the edge computing units of each computing nodes in the first computing node's cluster.

In some embodiments, the system may be configured to determine that the one or more attributes associated with the first multi-dimensional cube does not match the one or more attributes associated with the one or more multi-dimensional cubes stored on the centralized enterprise database server. In response, the system may be configured to transmit a notification to the user at the first computing node indicating that there are no configuration files available to execute the multi-dimensional cube. Accordingly, the user may be required to create the multi-dimensional cube by generating a new configuration file. In response, the system may be configured to retrieve metadata from the newly generated configuration file and update the edge computing units of the edge computing nodes with the metadata from the newly generated configuration file.

In some embodiments, the system may be configured to update the configuration file periodically based on the changes made to other configuration files stored on edge computing units of computing nodes, either inter-cluster or intra-cluster. In some other embodiments, the system may be configured to initiate an edge computing refresh subroutine based on any triggering event detected across the computing cluster. In one aspect, a triggering event may be any change made to a configuration file stored on edge computing units of computing nodes, either inter-cluster or intra-cluster.

FIG. 5 illustrates an exemplary metadata structure for a multi-dimensional cube and/or report 500, in accordance with an embodiment of the invention. As illustrated in FIG. 5, each configuration file may include a number of columns such as user id, edge node, domain, cube/report, processing time, last accessed on, context, calculations, query, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing real-time intelligence engine for data asset discovery, the system comprising:
    at least one non-transitory storage device; and
    at least one processing device coupled to the at least one non-transitory storage device, wherein the at least one processing device is configured to:
        electronically receive an indication that a first user has initiated a creation of a first multi-dimensional cube using a first computing node, wherein the first computing node is associated with a first computing cluster;
        initiate an asset recovery engine on the first computing node, wherein the first computing node is configured to store one or more configuration files associated with one or more multi-dimensional cubes that have been previously created by one or more computing nodes within the first computing cluster on a first edge computing unit of the first computing node, wherein initiating further comprises:
            comparing one or more attributes associated with the first multi-dimensional cube with one or more attributes associated with the one or more multi-dimensional cubes stored on the first edge computing unit of the first computing node to determine a match;
            determining a subset of the one or more multi-dimensional cubes stored on the first edge computing unit of the first computing node based on at least the match; and
            retrieving a first configuration file associated with the subset of the one or more multi-dimensional cubes stored on the first edge computing unit of the first computing node; and
        execute the creation of the first multi-dimensional cube based on the first configuration file using the first computing node.

2. The system of claim 1, wherein the at least one processing device is further configured to:
    determine that the one or more attributes associated with the first multi-dimensional cube does not match the one or more attributes associated with the one or more multi-dimensional cubes stored on the first edge computing unit of the first computing node; and
    retrieve one or more attributes associated with one or more multi-dimensional cubes stored on a second edge computing unit of a second computing node, wherein the second computing node is associated with a second computing cluster.

3. The system of claim 2, wherein the at least one processing device is further configured to:
    compare the one or more attributes associated with the first multi-dimensional cube with the one or more attributes associated with the one or more multi-dimensional cubes stored on the second edge computing unit of a second computing node to determine a match; and
    determine a subset of the one or more multi-dimensional cubes stored on the second edge computing unit of the second computing node based on at least the match.

4. The system of claim 3, wherein the at least one processing device is further configured to:
    retrieve metadata from a second configuration file associated with the subset of the one or more multi-dimensional cubes stored on the second edge computing unit of the second computing node;
    transmit the metadata retrieved from the second configuration file to the first edge computing unit of the first computing node; and
    execute the creation of the first multi-dimensional cube based on the metadata retrieved from the second configuration file.

5. The system of claim 4, wherein the at least one processing device is further configured to:
    update the first configuration file with the metadata retrieved from the second configuration file.

6. The system of claim 2, wherein the at least one processing device is further configured to:
    determine a partial match between the one or more attributes associated with the first multi-dimensional cube with the one or more attributes associated with the one or more multi-dimensional cubes stored on the second edge computing unit of the second computing node; and
determine the subset of the one or more multi-dimensional cubes stored on the second edge computing unit of the second computing node based on at least the partial match.

7. The system of claim 3, wherein the at least one processing device is further configured to:
determine that the one or more attributes associated with the first multi-dimensional cube does not match the one or more attributes associated with the one or more multi-dimensional cubes stored on the second edge computing unit of the second computing node; and
retrieve one or more attributes associated with one or more multi-dimensional cubes stored on a centralized enterprise database server.

8. The system of claim 7, wherein the at least one processing device is further configured to:
compare the one or more attributes associated with the first multi-dimensional cube with the one or more attributes associated with the one or more multi-dimensional cubes stored on the centralized enterprise database server to determine a match; and
determine a subset of the one or more multi-dimensional cubes stored on the centralized enterprise database server based on at least the match.

9. The system of claim 8, wherein the at least one processing device is further configured to:
retrieve a metadata from a third configuration file associated with the subset of the one or more multi-dimensional cubes stored on the centralized enterprise database server; and
transmit the metadata retrieved from the third configuration file to the first edge computing unit of the first computing node;
execute the creation of the first multi-dimensional cube based on the metadata retrieved from the third configuration file; and
update the first configuration file with the metadata retrieved from the third configuration file.

10. A computer implemented method for providing real-time intelligence engine for data asset discovery, the method comprising:
electronically receiving an indication that a first user has initiated a creation of a first multi-dimensional cube using a first computing node, wherein the first computing node is associated with a first computing cluster;
initiating an asset recovery engine on the first computing node, wherein the first computing node is configured to store one or more configuration files associated with one or more multi-dimensional cubes that have been previously created by one or more computing nodes within the first computing cluster on a first edge computing unit of the first computing node, wherein initiating further comprises:
comparing one or more attributes associated with the first multi-dimensional cube with one or more attributes associated with the one or more multi-dimensional cubes stored on the first edge computing unit of the first computing node to determine a match;
determining a subset of the one or more multi-dimensional cubes stored on the first edge computing unit of the first computing node based on at least the match; and
retrieving a first configuration file associated with the subset of the one or more multi-dimensional cubes stored on the first edge computing unit of the first computing node; and
executing the creation of the first multi-dimensional cube based on the first configuration file using the first computing node.

11. The method of claim 10, wherein the method further comprises:
determining that the one or more attributes associated with the first multi-dimensional cube does not match the one or more attributes associated with the one or more multi-dimensional cubes stored on the first edge computing unit of the first computing node; and
retrieving one or more attributes associated with one or more multi-dimensional cubes stored on a second edge computing unit of a second computing node, wherein the second computing node is associated with a second computing cluster.

12. The method of claim 11, wherein the method further comprises:
comparing the one or more attributes associated with the first multi-dimensional cube with the one or more attributes associated with the one or more multi-dimensional cubes stored on the second edge computing unit of a second computing node to determine a match; and
determining a subset of the one or more multi-dimensional cubes stored on the second edge computing unit of the second computing node based on at least the match.

13. The method of claim 12, wherein the method further comprises:
retrieving metadata from a second configuration file associated with the subset of the one or more multi-dimensional cubes stored on the second edge computing unit of the second computing node;
transmitting the metadata retrieved from the second configuration file to the first edge computing unit of the first computing node; and
executing the creation of the first multi-dimensional cube based on the metadata retrieved from the second configuration file.

14. The method of claim 13, wherein the method further comprises:
updating the first configuration file with the metadata retrieved from the second configuration file.

15. The method of claim 11, wherein the method further comprises:
determining a partial match between the one or more attributes associated with the first multi-dimensional cube with the one or more attributes associated with the one or more multi-dimensional cubes stored on the second edge computing unit of the second computing node; and
determining the subset of the one or more multi-dimensional cubes stored on the second edge computing unit of the second computing node based on at least the partial match.

16. The method of claim 12, wherein the method further comprises:
determining that the one or more attributes associated with the first multi-dimensional cube does not match the one or more attributes associated with the one or more multi-dimensional cubes stored on the second edge computing unit of the second computing node; and retrieving one or more attributes associated with one or more multi-dimensional cubes stored on a centralized enterprise database server.

17. The method of claim 16, wherein the method further comprises:
   comparing the one or more attributes associated with the first multi-dimensional cube with the one or more attributes associated with the one or more multi-dimensional cubes stored on the centralized enterprise database server to determine a match; and
   determining a subset of the one or more multi-dimensional cubes stored on the centralized enterprise database server based on at least the match.

18. The method of claim 17, wherein the method further comprises:
   retrieving a metadata from a third configuration file associated with the subset of the one or more multi-dimensional cubes stored on the centralized enterprise database server; and
   transmitting the metadata retrieved from the third configuration file to the first edge computing unit of the first computing node;
   executing the creation of the first multi-dimensional cube based on the metadata retrieved from the third configuration file; and
   updating the first configuration file with the metadata retrieved from the third configuration file.

19. A computer program product for providing real-time intelligence engine for data asset discovery, the computer program product comprising a non-transitory computer-readable medium comprising code causing a apparatus to:
   electronically receive an indication that a first user has initiated a creation of a first multi-dimensional cube using a first computing node, wherein the first computing node is associated with a first computing cluster;
   initiate an asset recovery engine on the first computing node, wherein the first computing node is configured to store one or more configuration files associated with one or more multi-dimensional cubes that have been previously created by one or more computing nodes within the first computing cluster on a first edge computing unit of the first computing node, wherein initiating further comprises:
      comparing one or more attributes associated with the first multi-dimensional cube with one or more attributes associated with the one or more multi-dimensional cubes stored on the first edge computing unit of the first computing node to determine a match;
      determining a subset of the one or more multi-dimensional cubes stored on the first edge computing unit of the first computing node based on at least the match; and
      retrieving a first configuration file associated with the subset of the one or more multi-dimensional cubes stored on the first edge computing unit of the first computing node; and
   execute the creation of the first multi-dimensional cube based on the first configuration file using the first computing node.

20. The computer program product of claim 19, wherein the apparatus is further configured to:
   determine that the one or more attributes associated with the first multi-dimensional cube does not match the one or more attributes associated with the one or more multi-dimensional cubes stored on the first edge computing unit of the first computing node; and
   retrieve one or more attributes associated with one or more multi-dimensional cubes stored on a second edge computing unit of a second computing node, wherein the second computing node is associated with a second computing cluster.

* * * * *